United States Patent Office.

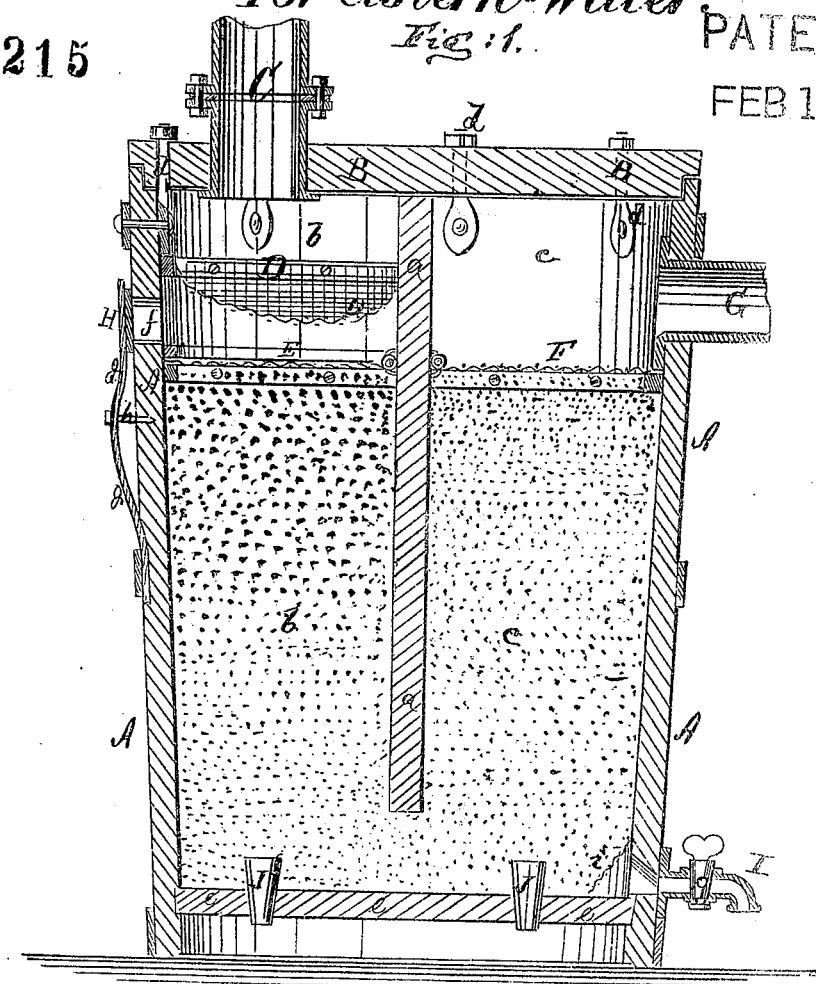
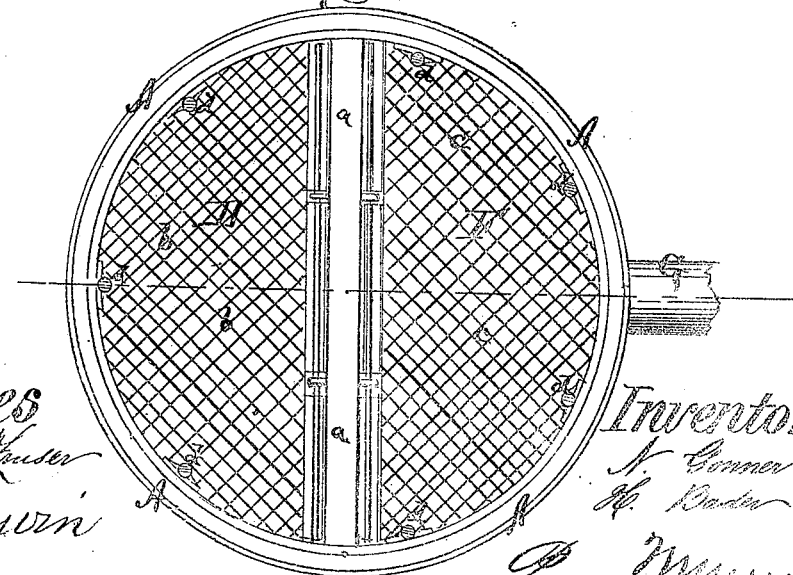

NICOLAS GONNER AND HERMAN BADER, OF CAPE GIRARDEAU, MISSOURI.

Letters Patent No. 74,215, dated February 11, 1868.

IMPROVEMENT IN CISTERN-FILTERS.

The Schedule referred to in these Letters Patent and making part of the same.

TO ALL WHOM IT MAY CONCERN:

Be it known that we, NICOLAS GONNER and HERMAN BADER, of Cape Girardeau, in the county of Cape Girardeau, and State of Missouri, have invented a new and improved Filter for Cistern-Water; and we do hereby declare that the following is a full, clear, and exact description thereof, which will enable others skilled in the art to make and use the same, reference being had to the accompanying drawings, forming part of this specification.

Figure 1 represents a vertical central section of our invention.
Figure 2 is a plan or top view of the same, the cover of the tank being removed.
Similar letters of reference indicate corresponding parts.

This invention relates to a new device for filtering rain-water on its passage from the roof of a building to the cistern. Such water is generally filled with leaves, pieces of shingles, and other impurities. The object of our invention is to clear it of such impurities before it enters the cistern.

The invention consists in the use of a tank or barrel, which is divided, by a vertical partition, into two compartments. The water passes down in one compartment and up in the other, and is, during such passage, cleansed or filtered by several sieves and layers of gravel and powdered charcoal. A valve is arranged in the side of the barrel for the discharge of water, should the same flow too quick from the roof, said valve being adjustable, so that it can only be opened when the water presses against it with a certain degree of force.

A represents a tub, barrel, or other suitable wooden or other vessel. It is divided by a vertical partition, a, into two compartments, b and c, as is shown in the drawings. B is the cover of the barrel, and is held down by means of bolts d d, or otherwise. C is the pipe from the roof, entering the compartments b through the cover B, as shown in the drawing. The water from the roof flows through the pipe C into the upper part of the compartment b, through a concave sieve, D, arranged across the latter, upon which sieve the coarse impurities are deposited. The water then flows through another sieve, E, arranged somewhat below D in the compartment b, and then enters the lower part of the compartment b, which is filled with a layer of gravel. The partition a does not quite reach to the bottom of the vessel A, and the water, after it arrives at the said bottom, flows through the opening between the lower end of the partition and the bottom, e, of the vessel into the compartment c, in the lower part of which powdered charcoal is contained, or other suitable material for absorbing noxious gases. The water, rising in the compartment c, flows through a sieve, F, into the upper part of the compartment c, and thence off into the cistern through a pipe, G. The sieves E and F are for confining the sand and coal, to prevent the same from being carried off with the water. The sieves E and F are hinged to the partition a, and rest upon suitable supports projecting from the inside of the vessel A. H is a valve, arranged in the wall of the vessel A, between the sieves D and E, to carry off the water if the same should flow too quick, or if it cannot flow any more at all, through the other channels, when the cistern is filled, for example. The valve is fitted over a note, $j$, as shown, and is secured to a spring, $g$, the pressure of which can be regulated by a screw, $h$, as shown in fig. 1. I is a faucet for discharging the water wholly from the vessel A. A sieve, $i$, arranged over its entrance prevents the sand and coal from also escaping through the faucet. J J are stoppers in the bottom of the vessel for discharging the sand and coal whenever desired.

We claim as new, and desire to secure by Letters Patent—

1. A filter, consisting of the parts A, B, C, D, E, F, G, and a, substantially as described.
2. In combination with the above, we claim the valve H, faucet I, and stoppers J, substantially as herein described.

NICOLAS GONNER,
HERMAN BADER.

Witnesses:
G. A. TIRMENSTEIR,
LEOPOLD HORSTIN.